United States Patent
Peng et al.

(10) Patent No.: US 10,742,057 B2
(45) Date of Patent: Aug. 11, 2020

(54) SELF-LOOP DETECTION METHOD AND APPARATUS FOR CHARGING DEVICE

(71) Applicant: Huawei Technologies Co., Ltd., Shenzhen (CN)

(72) Inventors: Wanbao Peng, Kuala Lumpu (MY); Fengxin Wang, Xi'an (CN); Lixiang Zheng, Shenzhen (CN); Shengcai Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 15/557,332

(22) PCT Filed: Mar. 10, 2015

(86) PCT No.: PCT/CN2015/073953
§ 371 (c)(1),
(2) Date: Sep. 11, 2017

(87) PCT Pub. No.: WO2016/141554
PCT Pub. Date: Sep. 15, 2016

(65) Prior Publication Data
US 2018/0054067 A1    Feb. 22, 2018

(51) Int. Cl.
*H02J 7/04* (2006.01)
*H02J 7/16* (2006.01)
*H02J 7/00* (2006.01)

(52) U.S. Cl.
CPC ............... *H02J 7/007* (2013.01); *H02J 7/00* (2013.01)

(58) Field of Classification Search
CPC ........... Y02E 60/12; H02J 7/14; H02J 7/0068; H01M 10/441; H01M 10/44
See application file for complete search history.

(56) References Cited

U.S. PATENT DOCUMENTS

| 2002/0005707 A1 | 1/2002 | Kerai et al. |
| 2002/0130638 A1* | 9/2002 | Sherman ................... G06F 1/26 320/134 |

(Continued)

FOREIGN PATENT DOCUMENTS

| CN | 102761161 A | 10/2012 |
| CN | 102970059 A | 3/2013 |

(Continued)

OTHER PUBLICATIONS

Machine Translation and Abstract of Japanese Publication No. JP2005141732, Jun. 2, 2005, 22 pages.
Foreign Communication From a Counterpart Application, Japanese Application No. 2017-547542, Japanese Office Action dated Feb. 4, 2019, 8 pages.
Foreign Communication From a Counterpart Application, Japanese Application No. 2017-547542, English Translation of Japanese Office Action dated Feb. 4, 2019, 9 pages.

(Continued)

*Primary Examiner* — Arun C Williams
(74) *Attorney, Agent, or Firm* — Conley Rose, P.C.

(57) ABSTRACT

A self-loop detection method for a charging device includes switching a positive signal cable $D_o$ and a negative signal cable $D_o$ from a connected state to a disconnected state; and detecting whether a positive signal cable $D_i$ and a negative signal cable $D_i$ are switched from a connected state to a disconnected state; and if yes, determining that a self-loop exists in the charging device.

18 Claims, 5 Drawing Sheets

(56) References Cited

U.S. PATENT DOCUMENTS

| | | | |
|---|---|---|---|
| 2008/0192399 A1* | 8/2008 | Chen | H01M 10/425 361/115 |
| 2008/0238856 A1 | 10/2008 | Bhowmik et al. | |
| 2009/0102431 A1* | 4/2009 | Kung | H02J 7/0031 320/162 |
| 2010/0119881 A1* | 5/2010 | Patel | H01M 2/34 429/7 |
| 2010/0277118 A1* | 11/2010 | Wang | H02J 7/0004 320/103 |
| 2011/0050204 A1* | 3/2011 | Park | H01M 2/206 324/76.11 |
| 2011/0095722 A1* | 4/2011 | Chang | H02J 7/0055 320/107 |
| 2011/0254511 A1* | 10/2011 | Tam | H02J 7/0068 320/162 |
| 2013/0134787 A1 | 5/2013 | Sakakibara | |
| 2013/0193911 A1 | 8/2013 | Miller et al. | |
| 2013/0324167 A1* | 12/2013 | Bevil | H04M 1/725 455/458 |
| 2013/0342163 A1 | 12/2013 | Naruse | |
| 2015/0091532 A1* | 4/2015 | Kvieska | H02J 7/0052 320/137 |

FOREIGN PATENT DOCUMENTS

| | | |
|---|---|---|
| CN | 203368009 U | 12/2013 |
| CN | 103515662 A | 1/2014 |
| CN | 103516012 A | 1/2014 |
| CN | 103762694 A | 4/2014 |
| CN | 108075527 A | 5/2018 |
| JP | 2002044876 A | 2/2002 |
| JP | 2005141732 A | 6/2005 |
| JP | 2011125186 A | 6/2011 |
| JP | 2013116035 A | 6/2013 |
| JP | 2013142908 A | 7/2013 |
| JP | 2013250837 A | 12/2013 |
| JP | 2014003870 A | 1/2014 |
| WO | 2014089068 A1 | 6/2014 |

OTHER PUBLICATIONS

Machine Translation and Abstract of Chinese Publication No. CN102761161, Oct. 31, 2012, 23 pages.
Machine Translation and Abstract of Chinese Publication No. CN102970059, Mar. 13, 2013, 10 pages.
Machine Translation and Abstract of Chinese Publication No. CN103515662, Jan. 15, 2014, 12 pages.
Machine Translation and Abstract of Chinese Publication No. CN103762694, Apr. 30, 2014, 7 pages.
Machine Translation and Abstract of Japanese Publication No. JP2013250837, Dec. 12, 2013, 13 pages.
Foreign Communication From a Counterpart Application, European Application No. 15884237.7, Extended European Search Report dated Nov. 7, 2017, 5 pages.
Foreign Communication From a Counterpart Application, PCT Application No. PCT/CN2015/073953, English Translation of International Search Report dated Jul. 29, 2015, 2 pages.
Foreign Communication From a Counterpart Application, PCT Application No. PCT/CN2015/073953, English Translation of Written Opinion dated Jul. 29, 2015, 5 pages.
Machine Translation and Abstract of Chinese Publication No. CN108075527, May 25, 2018, 14 pages.
Machine Translation and Abstract of Chinese Publication No. CN203368009, Dec. 25, 2013, 10 pages.
Foreign Communication From a Counterpart Application, Chinese Application No. 201580020160.5, Chinese Office Action dated Jul. 3, 2018, 5 pages.
Foreign Communication From a Counterpart Application, Chinese Application No. 201580020160.5, Chinese Office Action dated Jan. 17, 2019, 8 pages.
Machine Translation and Abstract of Japanese Publication No. JP2011125186, Jun. 23, 2011, 22 pages.
Machine Translation and Abstract of Japanese Publication No. JP2013142908, Jul. 22, 2013, 24 pages.
Foreign Communication From a Counterpart Application, Japanese Application No. 2017-547542, Japanese Office Action dated Jul. 30, 2018, 6 pages.
Foreign Communication From a Counterpart Application, Japanese Application No. 2017-547542, English Translation of Japanese Office Action dated Jul. 30, 2018, 7 pages.

* cited by examiner

SELF-LOOP DETECTION METHOD AND APPARATUS FOR CHARGING DEVICE

CROSS-REFERENCE TO RELATED APPLICATIONS

This application is a national stage of International Application No. PCT/CN2015/073953, filed on Mar. 10, 2015, which is hereby incorporated by reference in its entirety.

TECHNICAL FIELD

The present disclosure relates to the field of circuit technologies, and in particular, to a self-loop detection method and apparatus for a charging device.

BACKGROUND

Mobile power supplies are widely used because they can conveniently charge devices such as tablet computers and mobile phones. As shown in FIG. 1, a mobile power supply 1 includes a large-capacity battery 10, a power supply management circuit 11, an inbound charging interface 12, an outbound charging interface 13, and the like. The inbound charging interface 12 is used by an external battery charger to charge the mobile power supply 1. The outbound charging interface 13 is used by the mobile power supply 1 to charge an external device (such as a tablet computer or a mobile phone). The mobile power supply 1 preferably can perform inbound charging and outbound charging at the same time, so that a user can conveniently use the mobile power supply 1.

As shown in FIG. 1, some users may directly connect the inbound charging interface 12 to the outbound charging interface 13. As a result, a current loop (the current loop is referred to as a self-loop below) is formed in the mobile power supply 1. Consequently, electric energy of the mobile power supply 1 is consumed in vain. In addition, if the inbound charging interface 12 and the outbound charging interface 13 are connected for an excessively long time, excessive heat of the mobile power supply 1 may even damage an internal circuit of the mobile power supply 1. Currently, it is not detected whether a self-loop exists in the mobile power supply 1 when the mobile power supply 1 performs inbound charging and outbound charging at the same time.

SUMMARY

Embodiments of the present disclosure provide a self-loop detection method and apparatus for a charging device, so as to detect, when the charging device performs inbound charging and outbound charging at the same time, whether a self-loop exists in the charging device.

To achieve the foregoing objective, the following technical solutions are used in the embodiments of the present disclosure.

According to a first aspect, a self-loop detection method for a charging device is provided, where the charging device includes an inbound charging interface and an outbound charging interface, where the inbound charging interface includes a positive signal cable $D_i$ and a negative signal cable $D_i$, the outbound charging interface includes a positive signal cable $D_o$ and a negative signal cable $D_o$, the inbound charging interface is in an inbound charging state, and the outbound charging interface is in an outbound charging state; and the method includes switching the positive signal cable $D_o$ and the negative signal cable $D_o$ from a connected state to a disconnected state; and detecting whether the positive signal cable $D_i$ and the negative signal cable $D_i$ are switched from a connected state to a disconnected state; and if yes, determining that a self-loop exists in the charging device.

With reference to the first aspect, in a first possible implementation manner, after the determining that a self-loop exists in the charging device, the method further includes controlling the outbound charging interface to enter an outbound charging stop state; or controlling the inbound charging interface to enter an inbound charging stop state; or controlling a value of a current flowing into the inbound charging interface, so that the current value is less than a maximum current value that exists when the self-loop exists in the charging device.

With reference to the first aspect, in a second possible implementation manner, after the determining that a self-loop exists in the charging device, the method further includes outputting a prompt message, where the prompt message is used to remind a user that the self-loop exists in the charging device.

With reference to the second possible implementation manner of the first aspect, in a third possible implementation manner, after the outputting a prompt message, the method further includes determining whether the self-loop of the charging device is eliminated; and if not, controlling the outbound charging interface to enter an outbound charging stop state; or if not, controlling the inbound charging interface to enter an inbound charging stop state; or if not, controlling a value of a current flowing into the inbound charging interface, so that the current value is less than a maximum current value that exists when the self-loop exists in the charging device.

With reference to the third possible implementation manner of the first aspect, in a fourth possible implementation manner, the determining whether the self-loop of the charging device is eliminated includes detecting whether a connection cable is removed from the outbound charging interface and/or detecting whether a connection cable is removed from the inbound charging interface; and if the connection cable is removed, determining that the self-loop of the charging device is eliminated.

According to a second aspect, a self-loop detection method for a charging device is provided, where the charging device includes an inbound charging interface and an outbound charging interface; and the method includes switching the outbound charging interface from an outbound charging state to an outbound charging stop state; and detecting whether the inbound charging interface is switched from an inbound charging state to an inbound charging stop state; and if yes, determining that a self-loop exists in the charging device when the outbound charging interface is in the outbound charging state.

With reference to the second aspect, in a first possible implementation manner, after the determining that a self-loop exists in the charging device when the outbound charging interface is in the outbound charging state, the method further includes outputting a prompt message, where the prompt message is used to remind a user that a self-loop exists in the charging device when the outbound charging interface is in the outbound charging state again.

According to a third aspect, a self-loop detection apparatus for a charging device is provided, where the charging device includes an inbound charging interface and an outbound charging interface, where the inbound charging interface includes a positive signal cable $D_i$ and a negative signal cable $D_i$, the outbound charging interface includes a positive signal cable $D_o$ and a negative signal cable $D_o$, the inbound charging interface is in an inbound charging state, and the outbound charging interface is in an outbound charging state; and the apparatus includes a switching unit configured to switch the positive signal cable $D_o$ and the negative signal cable $D_o$ from a connected state to a disconnected state; a detection unit configured to detect whether the positive signal cable $D_i$ and the negative signal cable $D_i$ are switched from a connected state to a disconnected state; and a determining unit configured to, when the detection unit detects that the positive signal cable $D_i$ and the negative signal cable $D_i$ are switched from the connected state to the disconnected state, determine that a self-loop exists in the charging device.

With reference to the third aspect, in a first possible implementation manner, the apparatus further includes a control unit configured to control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

With reference to the third aspect, in a second possible implementation manner, the apparatus further includes an output unit configured to output a prompt message, where the prompt message is used to remind a user that the self-loop exists in the charging device.

With reference to the second possible implementation manner of the third aspect, in a third possible implementation manner, the determining unit is further configured to determine whether the self-loop of the charging device is eliminated; and the control unit is further configured to, when the determining unit determines that the self-loop of the charging device is not eliminated, control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

With reference to the third possible implementation manner of the third aspect, in a fourth possible implementation manner, the detection unit is further configured to detect whether a connection cable is removed from the outbound charging interface and/or detect whether a connection cable is removed from the inbound charging interface; and the determining unit is further configured to, when the detection unit detects that the connection cable is removed from the outbound charging interface and/or detects that the connection cable is removed from the inbound charging interface, determine that the self-loop of the charging device is eliminated.

According to a fourth aspect, a self-loop detection apparatus for a charging device is provided, where the charging device includes an inbound charging interface and an outbound charging interface; and the apparatus includes a switching unit configured to switch the outbound charging interface from an outbound charging state to an outbound charging stop state; a detection unit configured to detect whether the inbound charging interface is switched from an inbound charging state to an inbound charging stop state; and a determining unit configured to, when the detection unit detects that the inbound charging interface is switched from the inbound charging state to the inbound charging stop state, determine that a self-loop exists in the charging device when the outbound charging interface is in the outbound charging state.

With reference to the fourth aspect, in a first possible implementation manner, the apparatus further includes an output unit configured to output a prompt message, where the prompt message is used to remind a user that a self-loop exists in the charging device when the outbound charging interface is in the outbound charging state again.

According to a fifth aspect, a self-loop detection apparatus for a charging device is provided, where the charging device includes an inbound charging interface and an outbound charging interface, where the inbound charging interface includes a positive signal cable $D_i$ and a negative signal cable $D_i$, the outbound charging interface includes a positive signal cable $D_o$ and a negative signal cable $D_o$, the inbound charging interface is in an inbound charging state, and the outbound charging interface is in an outbound charging state; and the apparatus includes a memory and a processor, where the memory is configured to store a set of code, and the code is used to control the processor to perform the following operations: switching the positive signal cable $D_o$ and the negative signal cable $D_o$ from a connected state to a disconnected state; detecting whether the positive signal cable $D_i$ and the negative signal cable $D_i$ are switched from a connected state to a disconnected state; and determining, when it is detected that the positive signal cable $D_i$ and the negative signal cable $D_i$ are switched from the connected state to the disconnected state, that a self-loop exists in the charging device.

With reference to the fifth aspect, in a first possible implementation manner, the processor is further configured to control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

With reference to the fifth aspect, in a second possible implementation manner, the processor is further configured to output a prompt message, where the prompt message is used to remind a user that the self-loop exists in the charging device.

With reference to the second possible implementation manner of the fifth aspect, in a third possible implementation manner, the processor is further configured to determine whether the self-loop of the charging device is eliminated; and when it is determined that the self-loop of the charging device is not eliminated, control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

With reference to the third possible implementation manner of the fifth aspect, in a fourth possible implementation manner, the processor is further configured to detect whether a connection cable is removed from the outbound charging interface and/or detect whether a connection cable is removed from the inbound charging interface; and when it is detected that the connection cable is removed from the outbound charging interface and/or it is detected that the connection cable is removed from the inbound charging interface, determine that the self-loop of the charging device is eliminated.

According to a sixth aspect, a self-loop detection apparatus for a charging device is provided, where the charging device includes an inbound charging interface and an outbound charging interface; and the apparatus includes a memory and a processor, where the memory is configured to store a set of code, and the code is used to control the processor to perform the following operations: switching the outbound charging interface from an outbound charging state to an outbound charging stop state; detecting whether the inbound charging interface is switched from an inbound charging state to an inbound charging stop state; and determining, when it is detected that the inbound charging interface is switched from the inbound charging state to the inbound charging stop state, that a self-loop exists in the charging device when the outbound charging interface is in the outbound charging state.

With reference to the sixth aspect, in a first possible implementation manner, the processor is further configured to output a prompt message, where the prompt message is used to remind a user that a self-loop exists in the charging device when the outbound charging interface is in the outbound charging state again.

According to the self-loop detection method and apparatus for a charging device provided in the embodiments of the present disclosure, when an outbound charging interface is in an outbound charging state, an inbound charging interface is in an inbound charging state, and a positive signal cable $D_i$ is connected to a negative signal cable $D_j$, whether a self-loop exists in the charging device is detected. When the self-loop exists in the charging device, and a positive signal cable $D_o$ of the outbound charging interface and a negative signal cable $D_o$ of the outbound charging interface are switched from a connected state to a disconnected state, the positive signal cable $D_i$ of the inbound charging interface and the negative signal cable $D_i$ of the inbound charging interface are also switched from a connected state to a disconnected state. Therefore, it may be detected, according to this feature, that the self-loop exists in the charging device.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Embodiment 1

Figure 1:
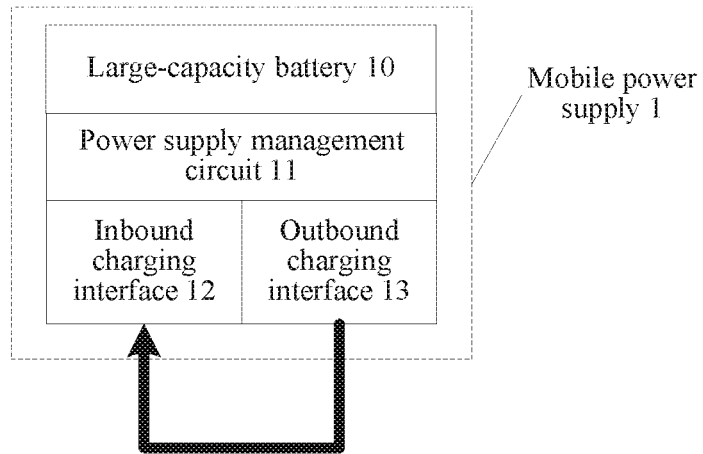
FIG. 1 is a schematic composition diagram of a mobile power supply in the prior art.
Figure 2:
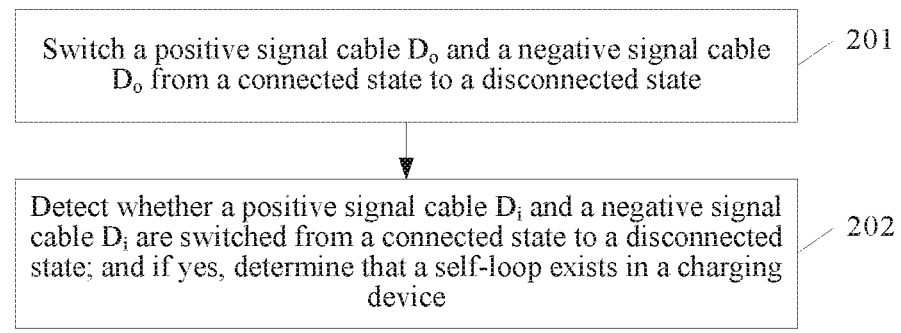
FIG. 2 is a flowchart of a self-loop detection method for a charging device according to an embodiment of the present disclosure.

This embodiment of the present disclosure provides a self-loop detection method for a charging device. The charging device includes an inbound charging interface and an outbound charging interface. The inbound charging interface includes a positive signal cable $D_i$ and a negative signal cable $D_i$. The outbound charging interface includes a positive signal cable $D_o$ and a negative signal cable $D_o$. The inbound charging interface is in an inbound charging state, and the outbound charging interface is in an outbound charging state. As shown in FIG. 2, the method includes the following steps.

201: Switch the positive signal cable $D_o$ and the negative signal cable $D_o$ from a connected state to a disconnected state.

It should be noted that the charging device in this embodiment of the present disclosure may charge an external device (such as a mobile phone or a tablet computer), and an external battery charger may also charge the charging device. The charging device may be a mobile power supply, or may be another device having the foregoing function. This embodiment of the present disclosure may be executed by the charging device, or may be a detection device that may implement the foregoing method. This is not limited in this embodiment of the present disclosure. An example of the technical solution provided in this embodiment of the present disclosure is described, and this embodiment of the present disclosure is executed, for example, by a detection device.

Figure 3:
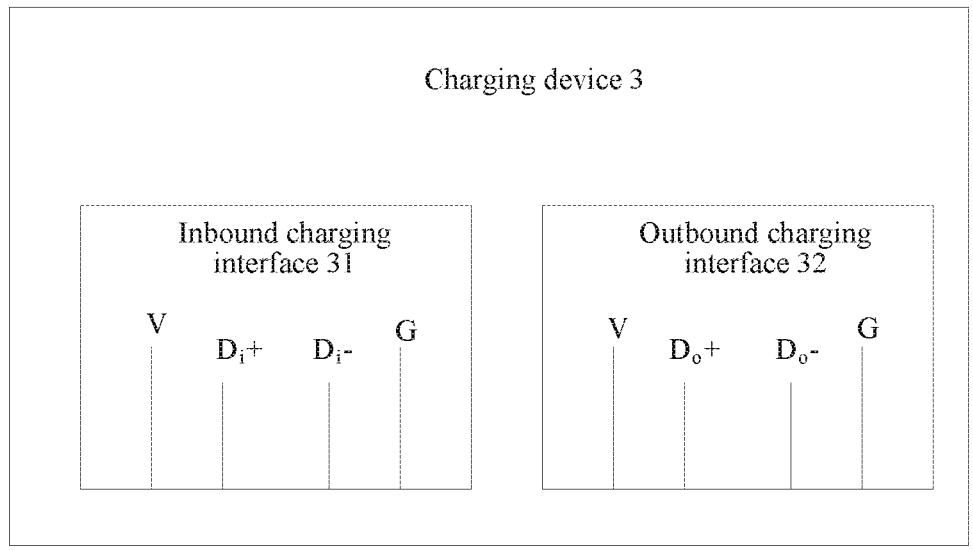
FIG. 3 is a schematic composition diagram of a charging device according to an embodiment of the present disclosure.

As shown in FIG. 3, a charging device 3 includes an inbound charging interface 31 and an outbound charging interface 32. The inbound charging interface 31 and the outbound charging interface 32 both include a positive signal cable D (may also be represented as "D+") and a negative signal cable D (may also be represented as "D−").

In this embodiment of the present disclosure, for ease of description and distinguishing, the positive signal cable D of the inbound charging interface 31 is represented as a positive signal cable $D_i$ (represented as $D_i+$ in FIG. 3), and the negative signal cable D of the inbound charging interface 31 is represented as a negative signal cable $D_i$ (represented as $D_i-$ in FIG. 3). The positive signal cable D of the outbound charging interface 32 is represented as a positive signal cable $D_o$ (represented as $D_o+$ in FIG. 3), and the negative signal cable D of the outbound charging interface 32 is represented as a negative signal cable $D_o$ (represented as $D_o-$ in FIG. 3).

When the inbound charging interface 31 is directly connected to the outbound charging interface 32, and the inbound charging interface 31 and the outbound charging interface 32 are both in working states, a self-loop exists in the charging device 3.

In addition, referring to FIG. 3, the inbound charging interface 31 and the outbound charging interface 32 both include a power cable (both are represented as V in FIG. 3) and a ground cable (both are represented as G in FIG. 3). Generally, the inbound charging interface 31 and the outbound charging interface 32 are connected to a same ground cable. The charging device 3 may further include a large-capacity battery, a power supply management circuit, and the like (not shown in FIG. 3).

During specific implementation of step 201, a switch may be disposed between the positive signal cable $D_o$ and the negative signal cable $D_o$. The detection device may control, using the switch, the positive signal cable $D_o$ and the negative signal cable $D_o$ to connect to or disconnect from each other.

It should be noted that in this embodiment of the present disclosure, after the positive signal cable $D_o$ and the negative signal cable $D_o$ are switched from the connected state to the disconnected state, the outbound charging interface of the charging device is still in the outbound charging state, that is, the power cable of the outbound charging interface is in a power supplying state.

202: Detect whether the positive signal cable $D_i$ and the negative signal cable $D_i$ are switched from a connected state to a disconnected state; and if yes, determine that a self-loop exists in the charging device.

It should be noted that when an external battery charger charges the charging device, two ends of a connection cable connecting the external battery charger to the inbound charging interface of the charging device include power cables, ground cables, positive signal cable Ds, and negative signal cable Ds corresponding to the external battery charger and the inbound charging interface. The positive signal cable D and the negative signal cable D of the external battery charger are respectively marked as $D_n+$ and $D_n-$ (not shown in FIG. 3). When the external battery charger is a standard battery charger and the external battery charger charges the charging device, $D_n+$ is connected to $D_n-$, and $D_i+$ is also connected to $D_i-$, so as to form a loop that passes through $D_n+$, $D_n-$, $D_i-$, and $D_i+$, and finally goes back to $D_n+$. When the external battery charger is a non-standard battery charger and the external battery charger charges the charging device, $D_n+$ is not connected to $D_n-$, and $D_i+$ is not connected to $D_i-$ either. Therefore, the charging device may determine, by detecting whether $D_i-$ is connected to $D_i+$, whether the external battery charger is a standard battery charger.

Similarly, when the charging device charges an external device, the external device may also detect, using the foregoing method, whether the charging device is a standard battery charger.

It should be noted that when an external battery charger charges the charging device, the charging device does not limit a magnitude of a current flowing into the charging device if identifying that the external battery charger is a standard battery charger; and the charging device limits a magnitude of a current flowing into the charging device if identifying that the external battery charger is a non-standard battery charger. In a charging process, the charging device identifies, only when charging just starts, whether an external battery charger is a standard battery charger. This same principle applies when the charging device charges an external device.

In this embodiment of the present disclosure, provided that the charging device is in the outbound charging state, the positive signal cable $D_o$ is connected to the negative signal cable $D_o$. Therefore, if a self-loop exists in the charging device, the positive signal cable $D_i$ is connected to the negative signal cable $D_i$. When the positive signal cable $D_o$ and the negative signal cable $D_o$ are switched from the connected state to the disconnected state, the positive signal cable $D_i$ and the negative signal cable $D_i$ are also switched from the connected state to the disconnected state. Therefore, whether the self-loop exists in the charging device may be detected according to this feature.

The following uses a table (Table 1) to more clearly describe correspondences among a state between the positive signal cable $D_i$ and the negative signal cable $D_i$ (the state is connected or disconnected), whether a self-loop exists in a power supply device, and whether the positive signal cable $D_i$ and the negative signal cable $D_i$ are switched from the connected state to the disconnected state (referred to as "whether a switchover is performed" in the table), before or after the detection device performs step 201 when the inbound charging interface is in different states. In the table, a state between the positive signal cable $D_i$ and the negative signal cable $D_i$ before step 201 is referred to as an A state, and a state between the positive signal cable $D_i$ and the negative signal cable $D_i$ after step 201 is referred to as a B state.

TABLE 1

| Working state of an inbound charging interface | Whether a self-loop exists in a power supply device | A state | B state | Whether a switchover is performed |
|---|---|---|---|---|
| Inbound working stop state | No | Disconnected | Disconnected | No |
| Inbound working state (connected to a standard battery charger) | No | Connected | Connected | No |

TABLE 1-continued

| Working state of an inbound charging interface | Whether a self-loop exists in a power supply device | A state | B state | Whether a switchover is performed |
|---|---|---|---|---|
| Inbound working state (connected to a non-standard battery charger) | No | Disconnected | Disconnected | No |
| Inbound working state (connected to an outbound charging interface) | Yes | Connected | Disconnected | Yes |

It may be seen from Table 1 that, provided that the outbound charging interface is in the outbound charging state, the detection device may determine, by detecting whether the positive signal cable $D_i$ and the negative signal cable $D_i$ are switched between the connected state and the disconnected state, whether a self-loop exists in the charging device.

It may also be known from Table 1 that, only when the outbound charging interface is in the outbound charging state, the inbound charging interface is in the inbound charging state, and the positive signal cable $D_i$ is connected to the negative signal cable $D_i$, a self-loop may exist in the charging device. In this embodiment of the present disclosure, detection is performed on the charging device after it is determined that the positive signal cable $D_i$ is connected to the negative signal cable $D_i$, thereby improving detection efficiency of the detection device.

It should be noted that when the detection device has not detected that a self-loop exists in the charging device, the positive signal cable $D_o$ and the negative signal cable $D_o$ of the charging device may be restored to a short-circuit state.

Optionally, after step 202, the method may further include controlling the outbound charging interface to enter an outbound charging stop state; or controlling the inbound charging interface to enter an inbound charging stop state; or controlling a value of a current flowing into the inbound charging interface, so that the current value is less than a maximum current value that exists when the self-loop exists in the charging device.

It should be noted that when the detection device controls the outbound charging interface to enter the outbound charging stop state or controls the inbound charging interface to enter the inbound charging stop state, the self-loop existing in the charging device is eliminated.

When the detection device controls the value of the current flowing into the inbound charging interface, the self-loop still exists in the charging device. However, because the current value is less than the maximum current value that exists when the self-loop exists in the charging device, electric energy consumption caused because the self-loop exists in the charging device may be reduced. In addition, a smaller current value is better. This is because a smaller current value indicates smaller electric energy consumption caused because the self-loop exists in the charging device. It should be noted that because the charging device identifies at the beginning that an external battery charger (when a self-loop exists in the charging device, the charging device charges itself) that charges the charging device is a standard battery charger, a magnitude of a current flowing into the charging device is not limited. When a self-loop exists in the charging device, the detection device controls a value of a current flowing into the inbound charging interface.

When the detection device detects that a self-loop exists in the charging device, the detection device may output a control message to a power supply management circuit in the charging device. The power supply management circuit controls an internal circuit of the power supply management circuit according to the control message, so as to control a state of the inbound charging interface or the outbound charging interface.

Optionally, after step 202, the method may further include outputting a prompt message. The prompt message is used to remind a user that the self-loop exists in the charging device.

For example, the detection device may remind a user by turning on or turning off an indicator or displaying a digit/word on a screen. When the detection device has a communications function, the detection device may also remind the user by sending a message to a device such as a mobile phone of the user. This is not limited in this embodiment of the present disclosure. In addition, when a user knows that the self-loop exists in the charging device, the user may manually eliminate the self-loop. The self-loop of the charging device may be eliminated by removing a connection cable from the inbound charging interface and/or the outbound charging interface of the charging device.

Optionally, after the outputting a prompt message, the method further includes determining whether the self-loop of the charging device is eliminated; and if not, controlling the outbound charging interface to enter an outbound charging stop state; or if not, controlling the inbound charging interface to enter an inbound charging stop state; or if not, controlling a value of a current flowing into the inbound charging interface, so that the current value is less than a maximum current value that exists when the self-loop exists in the charging device.

Optionally, the determining whether the self-loop of the charging device is eliminated includes detecting whether a connection cable is removed from the outbound charging interface and/or detecting whether a connection cable is removed from the inbound charging interface; and if the connection cable is removed, determining that the self-loop of the charging device is eliminated.

For example, the detection device may detect whether a voltage of the power cable of the inbound charging interface is zero, and if the voltage of the power cable of the inbound charging interface is zero, the detection device determines that the connection cable is removed from the inbound charging interface.

It should be noted that when a user removes the connection cable from the outbound charging interface or the inbound charging interface of the charging device, the detection device may detect this case. If the detection device detects this case within a particular time period after the detection device outputs the prompt message, it may be determined that the self-loop of the charging device is eliminated. If the detection device does not detect this case within a particular time period after the detection device outputs the prompt message, it may be determined that the self-loop of the charging device is not eliminated.

It should be noted that in this embodiment of the present disclosure, when the outbound charging interface is in the outbound charging stop state, the connection cable is not removed from the outbound charging interface; and when the inbound charging interface is in the inbound charging stop state, the connection cable is not removed from the inbound charging interface either.

In addition, a condition that triggers the outbound charging interface to be in the outbound charging state again may be that: a user manually performs setting, or the connection cable on the outbound charging interface is connected to the outbound charging interface again, or the connection cable on the inbound charging interface is connected to the inbound charging interface again.

According to the self-loop detection method for a charging device provided in this embodiment of the present disclosure, when an outbound charging interface is in an outbound charging state, an inbound charging interface is in an inbound charging state, and a positive signal cable $D_i$ is connected to a negative signal cable $D_i$, whether a self-loop exists in the charging device is detected. When the self-loop exists in the charging device, and a positive signal cable $D_o$ of the outbound charging interface and a negative signal cable $D_o$ of the outbound charging interface are switched from a connected state to a disconnected state, the positive signal cable $D_i$ of the inbound charging interface and the negative signal cable $D_i$ of the inbound charging interface are also switched from a connected state to a disconnected state. Therefore, it may be detected, according to this feature, that the self-loop exists in the charging device.

Embodiment 2

Figure 4:
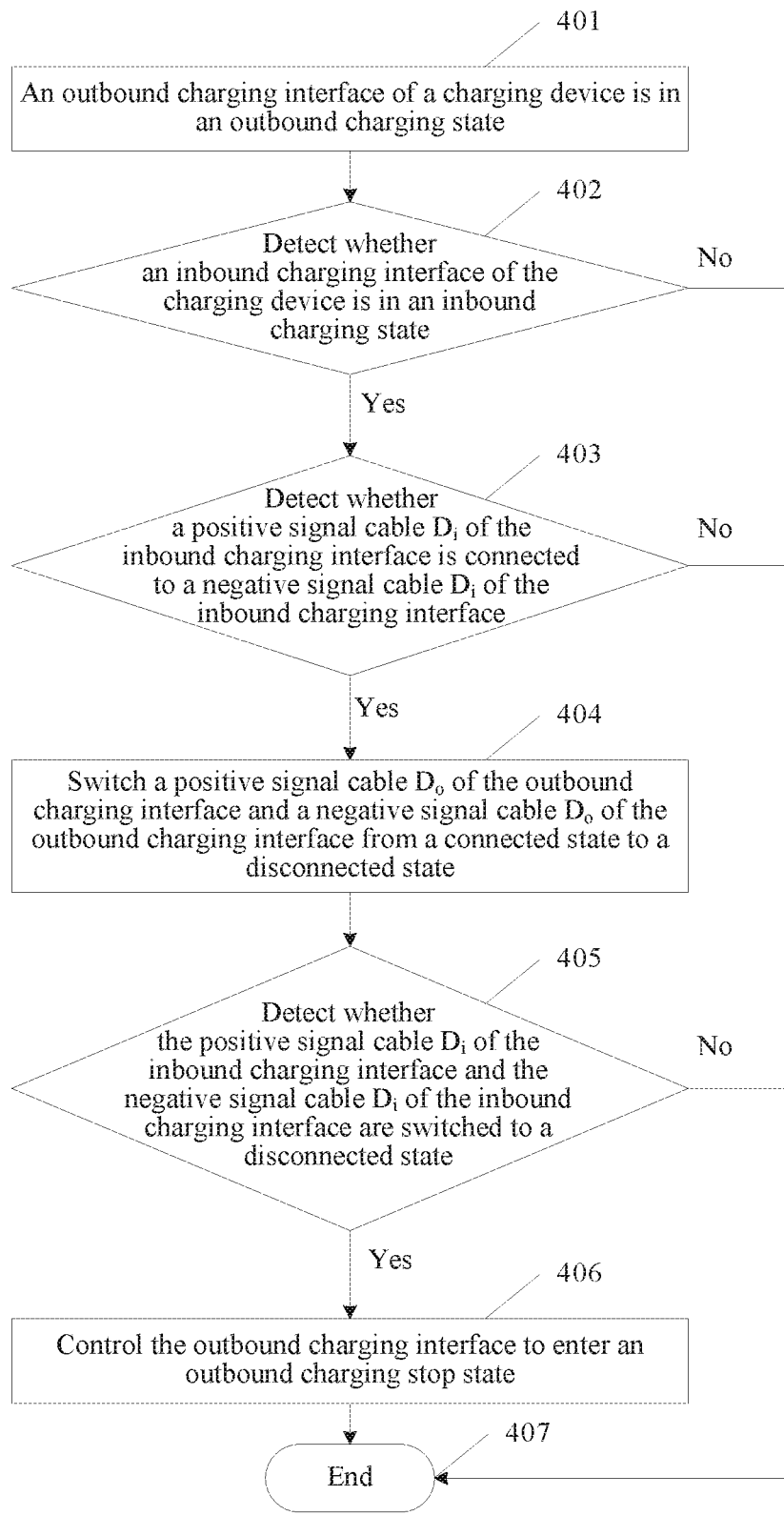
FIG. 4 is a flowchart of another self-loop detection method for a charging device according to an embodiment of the present disclosure.

This embodiment is a specific embodiment of the self-loop detection method for a charging device provided in the foregoing embodiment. For related explanations in this embodiment, refer to the foregoing embodiment. As shown in FIG. 4, the self-loop detection method for a charging device includes the following steps.

401: An outbound charging interface of a charging device is in an outbound charging state.

In this case, a positive signal cable $D_o$ of the outbound charging interface is connected to a negative signal cable $D_o$ of the outbound charging interface. A switch may be disposed between the positive signal cable $D_o$ and the negative signal cable $D_o$. A detection device may control, using the switch, the positive signal cable $D_o$ and the negative signal cable $D_o$ to connect to or disconnect from each other.

402: Detect whether an inbound charging interface of the charging device is in an inbound charging state.

If yes, perform step 403; and if not, perform step 407.

When the detection device detects that there is a voltage on a power cable of the inbound charging interface, it is considered that the inbound charging interface is in the inbound charging state.

403: Detect whether a positive signal cable $D_i$ of the inbound charging interface is connected to a negative signal cable $D_i$ of the inbound charging interface.

If yes, perform step 404; and if not, perform step 407.

It should be noted that because the positive signal cable $D_o$ of the outbound charging interface is connected to the negative signal cable $D_o$ of the outbound charging interface, when a self-loop exists in the charging device, the positive signal cable $D_i$ of the inbound charging interface is connected to the negative signal cable $D_i$ of the inbound charging interface.

It should be noted that in this embodiment, a condition that triggers the detection device to detect whether a self-loop exists in the charging device is that: the outbound charging interface is in the outbound charging state, the inbound charging interface is in the inbound charging state, and the positive signal cable $D_i$ is connected to the negative signal cable $D_i$.

404: Switch a positive signal cable $D_o$ of the outbound charging interface and a negative signal cable $D_o$ of the outbound charging interface from a connected state to a disconnected state.

405: Detect whether the positive signal cable $D_i$ of the inbound charging interface and the negative signal cable $D_i$ of the inbound charging interface are switched to a disconnected state.

If yes, it is determined that a self-loop exists in the charging device, and perform step 406. If not, perform step 407.

406: Control the outbound charging interface to enter an outbound charging stop state.

407: End.

According to the self-loop detection method for a charging device provided in this embodiment of the present disclosure, when an outbound charging interface is in an outbound charging state, an inbound charging interface is in an inbound charging state, and a positive signal cable $D_i$ is connected to a negative signal cable $D_i$, whether a self-loop exists in the charging device is detected. When the self-loop exists in the charging device, and a positive signal cable $D_o$ of the outbound charging interface and a negative signal cable $D_o$ of the outbound charging interface are switched from a connected state to a disconnected state, the positive signal cable $D_i$ of the inbound charging interface and the negative signal cable $D_i$ of the inbound charging interface are also switched from a connected state to a disconnected state. Therefore, it may be detected, according to this feature, that the self-loop exists in the charging device.

Embodiment 3

Figure 5:
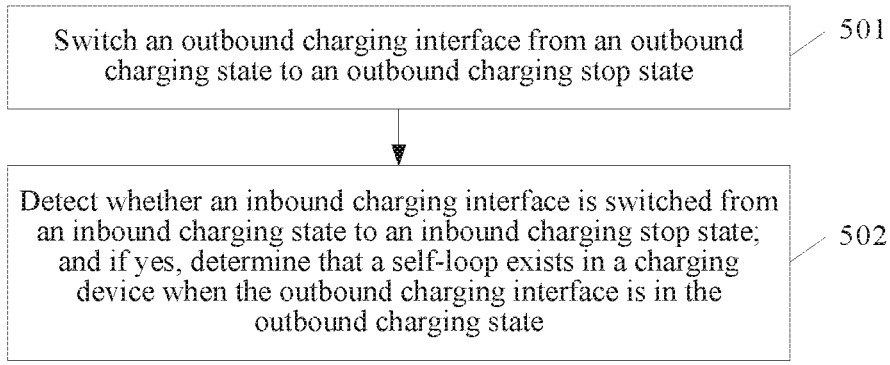
FIG. 5 is a flowchart of still another self-loop detection method for a charging device according to an embodiment of the present disclosure.

This embodiment of the present disclosure provides a self-loop detection method for a charging device. The charging device includes an inbound charging interface and an outbound charging interface. As shown in FIG. 5, the method includes the following steps.

501: Switch an outbound charging interface from an outbound charging state to an outbound charging stop state.

For related explanations in this embodiment of the present disclosure, refer to the foregoing embodiment.

When the outbound charging interface of the charging device starts to perform outbound charging and the inbound charging interface starts to perform inbound charging, a detection device may start to detect whether a self-loop exists in the charging device.

502: Detect whether the inbound charging interface is switched from an inbound charging state to an inbound charging stop state; and if yes, determine that a self-loop exists in the charging device when the outbound charging interface is in the outbound charging state.

When the self-loop exists in the charging device, the inbound charging interface and the outbound charging interface of the charging device are connected to each other. Therefore, when the outbound charging interface is switched from the outbound charging state to the outbound charging stop state, the inbound charging interface is naturally switched from the inbound charging state to the inbound charging stop state. Therefore, whether the self-loop exists in the charging device may be detected according to this feature.

After step 501, the detection device has eliminated the self-loop from the charging device. However, a connection cable that connects the inbound charging interface and the outbound charging interface of the charging device is not removed. Therefore, the self-loop still exists when the charging device is started at a next time.

Optionally, after step 502, the method may further include outputting a prompt message. The prompt message is used to remind a user that a self-loop exists in the charging device when the outbound charging interface is in the outbound charging state again.

When seeing the prompt message, a user may remove the connection cable that is connected to the inbound charging interface and/or the outbound charging interface of the charging device, so as to avoid that the self-loop still exists in the charging device when the charging device is started at a next time.

In addition, a condition that triggers the outbound charging interface to be in the outbound charging state again may be that: a user manually performs setting, or the connection cable on the outbound charging interface is connected to the outbound charging interface again, or the connection cable on the inbound charging interface is connected to the inbound charging interface again.

According to the self-loop detection method for a charging device provided in this embodiment of the present disclosure, when a self-loop exists in the charging device, an inbound charging interface and an outbound charging interface of the charging device are connected to each other. Therefore, when the outbound charging interface is switched from an outbound charging state to an outbound charging stop state, the inbound charging interface is naturally switched from an inbound charging state to an inbound charging stop state. Therefore, a detection device may determine, according to this feature, whether the self-loop exists in the charging device.

Embodiment 4

Figure 6:
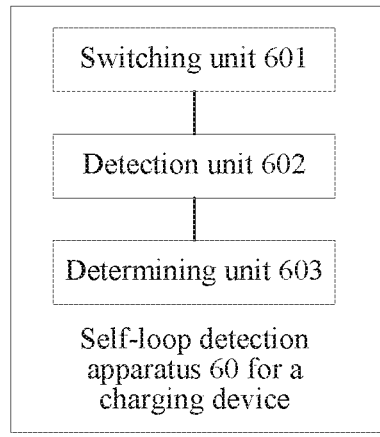
FIG. 6 is a schematic composition diagram of a self-loop detection apparatus for a charging device according to an embodiment of the present disclosure.

This embodiment of the present disclosure provides a self-loop detection apparatus 60 for a charging device, to execute the self-loop detection method for a charging device shown in FIG. 2. As shown in FIG. 6, the apparatus 60 includes a switching unit 601, a detection unit 602, and a determining unit 603.

The switching unit 601 is configured to switch the positive signal cable $D_o$ and the negative signal cable $D_o$ from a connected state to a disconnected state.

The detection unit 602 is configured to detect whether the positive signal cable $D_i$ and the negative signal cable $D_i$ are switched from a connected state to a disconnected state.

The determining unit 603 is configured to, when the detection unit 602 detects that the positive signal cable $D_i$ and the negative signal cable $D_i$ are switched from the connected state to the disconnected state, determine that a self-loop exists in the charging device.

Figure 7:
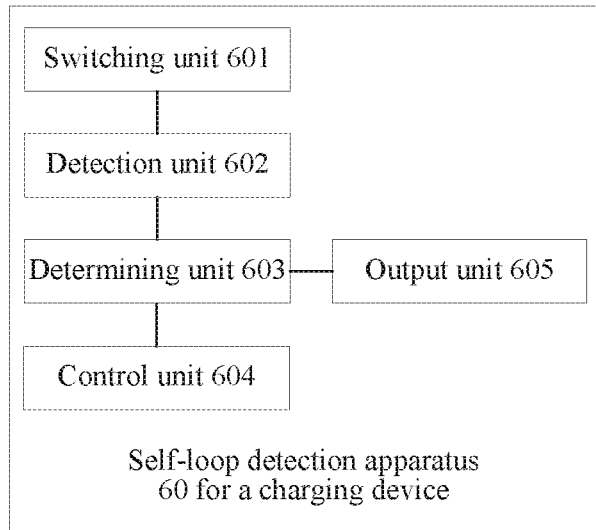
FIG. 7 is a schematic composition diagram of another self-loop detection apparatus for a charging device according to an embodiment of the present disclosure.

Optionally, as shown in FIG. 7, the apparatus 60 further includes a control unit 604 configured to control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

Optionally, as shown in FIG. 7, the apparatus 60 further includes an output unit 605 configured to output a prompt message. The prompt message is used to remind a user that the self-loop exists in the charging device.

Optionally, the determining unit 603 is further configured to determine whether the self-loop of the charging device is eliminated; and the control unit 604 is further configured to, when the determining unit 603 determines that the self-loop of the charging device is not eliminated, control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

Optionally, the detection unit 602 is further configured to detect whether a connection cable is removed from the outbound charging interface and/or detect whether a connection cable is removed from the inbound charging interface; and the determining unit 603 is further configured to, when the detection unit 602 detects that the connection cable is removed from the outbound charging interface and/or detects that the connection cable is removed from the inbound charging interface, determine that the self-loop of the charging device is eliminated.

According to the self-loop detection apparatus for a charging device provided in this embodiment of the present disclosure, when an outbound charging interface of the charging device is in an outbound charging state, an inbound charging interface of the charging device is in an inbound charging state, and a positive signal cable $D_i$, is connected to a negative signal cable $D_i$, whether a self-loop exists in the charging device is detected. When the self-loop exists in the charging device, and a positive signal cable $D_o$ of the outbound charging interface and a negative signal cable $D_o$ of the outbound charging interface are switched from a connected state to a disconnected state, the positive signal cable $D_i$ of the inbound charging interface and the negative signal cable $D_i$ of the inbound charging interface are also switched from a connected state to a disconnected state. Therefore, it may be detected, according to this feature, that the self-loop exists in the charging device.

Embodiment 5

During hardware implementation, the units in Embodiment 4 may be built in or independent of a processor of the self-loop detection apparatus for a charging device in a form of hardware, or may be stored in a memory of the self-loop detection apparatus for a charging device in a form of software, so as to be invoked by the processor to perform operations corresponding to the foregoing units. The processor may be a central processing unit (CPU), a microprocessor, a single-chip microcomputer, and the like.

Figure 8:
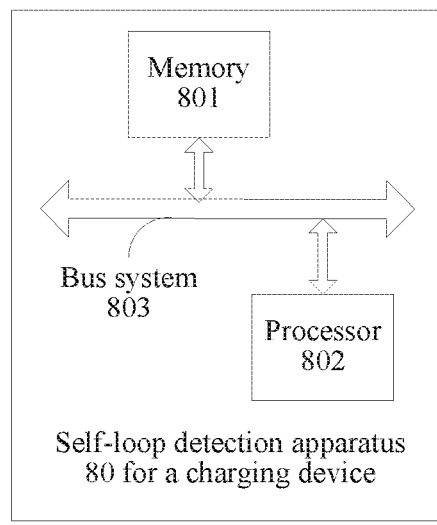
FIG. 8 is a schematic composition diagram of another self-loop detection apparatus for a charging device according to an embodiment of the present disclosure.

As shown in FIG. 8, FIG. 8 shows a self-loop detection apparatus 80 for a charging device according to an embodiment of the present disclosure, to execute the self-loop detection method for a charging device shown in FIG. 2. The apparatus 80 includes a memory 801, a processor 802, and a bus system 803.

The memory 801 and the processor 802 are coupled together using the bus system 803. In addition to a data bus, the bus system 803 may further include a power supply bus, a control bus, a state signal bus, and the like. However, for a purpose of clear description, various types of buses are all marked as the bus system 803 in the figure.

The memory 801 is configured to store a set of code, and the code is used to control the processor 802 to perform the following operations: switching the positive signal cable $D_o$ and the negative signal cable $D_o$ from a connected state to a disconnected state; detecting whether the positive signal cable $D_i$ and the negative signal cable $D_i$ are switched from a connected state to a disconnected state; and determining, when it is detected that the positive signal cable $D_i$ and the negative signal cable $D_i$ are switched from the connected state to the disconnected state, that a self-loop exists in the charging device.

Optionally, the processor 802 is further configured to control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

Optionally, the processor 802 is further configured to output a prompt message. The prompt message is used to remind a user that the self-loop exists in the charging device.

Optionally, the processor 802 is further configured to determine whether the self-loop of the charging device is eliminated; and when it is determined that the self-loop of the charging device is not eliminated, control the outbound charging interface to enter an outbound charging stop state; or control the inbound charging interface to enter an inbound charging stop state; or control a value of a current flowing into the inbound charging interface, so that the current value is less than a maximum current value that exists when the self-loop exists in the charging device.

Optionally, the processor 802 is further configured to detect whether a connection cable is removed from the outbound charging interface and/or detect whether a connection cable is removed from the inbound charging interface; and when it is detected that the connection cable is removed from the outbound charging interface and/or it is detected that the connection cable is removed from the inbound charging interface, determine that the self-loop of the charging device is eliminated.

According to the self-loop detection apparatus for a charging device provided in this embodiment of the present disclosure, when an outbound charging interface of the charging device is in an outbound charging state, an inbound charging interface of the charging device is in an inbound charging state, and a positive signal cable $D_i$ is connected to a negative signal cable $D_i$, whether a self-loop exists in the charging device is detected. When the self-loop exists in the charging device, and a positive signal cable $D_o$ of the outbound charging interface and a negative signal cable $D_o$ of the outbound charging interface are switched from a connected state to a disconnected state, the positive signal cable $D_i$ of the inbound charging interface and the negative signal cable $D_i$ of the inbound charging interface are also switched from a connected state to a disconnected state. Therefore, it may be detected, according to this feature, that the self-loop exists in the charging device.

Embodiment 6

Figure 9:
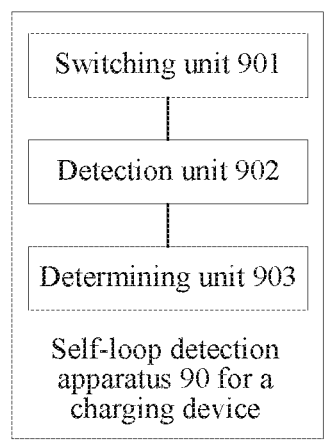
FIG. 9 is a schematic composition diagram of another self-loop detection apparatus for a charging device according to an embodiment of the present disclosure.

This embodiment of the present disclosure provides a self-loop detection apparatus 90 for a charging device, to execute the self-loop detection method for a charging device shown in FIG. 5. As shown in FIG. 9, the apparatus 90 includes a switching unit 901, a detection unit 902, and a determining unit 903.

The switching unit 901 is configured to switch the outbound charging interface from an outbound charging state to an outbound charging stop state.

The detection unit 902 is configured to detect whether the inbound charging interface is switched from an inbound charging state to an inbound charging stop state.

The determining unit 903 is configured to, when the detection unit 902 detects that the inbound charging interface is switched from the inbound charging state to the inbound charging stop state, determine that a self-loop exists in the charging device when the outbound charging interface is in the outbound charging state.

Figure 10:
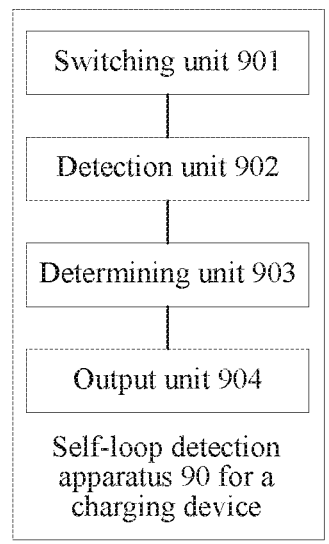
FIG. 10 is a schematic composition diagram of another self-loop detection apparatus for a charging device according to an embodiment of the present disclosure.

Optionally, as shown in FIG. 10, the apparatus 90 further includes an output unit 904 configured to output a prompt message, where the prompt message is used to remind a user that a self-loop exists in the charging device when the outbound charging interface is in the outbound charging state again.

According to the self-loop detection apparatus for a charging device provided in this embodiment of the present disclosure, when a self-loop exists in the charging device, an inbound charging interface and an outbound charging interface of the charging device are connected to each other. Therefore, when the outbound charging interface is switched from an outbound charging state to an outbound charging stop state, the inbound charging interface is naturally switched from an inbound charging state to an inbound charging stop state. Therefore, the detection apparatus may determine, according to this feature, whether the self-loop exists in the charging device.

Embodiment 7

During hardware implementation, the units in Embodiment 6 may be built in or independent of a processor of the self-loop detection apparatus for a charging device in a form of hardware, or may be stored in a memory of the self-loop detection apparatus for a charging device in a form of software, so as to be invoked by the processor to perform operations corresponding to the foregoing units. The processor may be a CPU, a microprocessor, a single-chip microcomputer, and the like.

Figure 11:
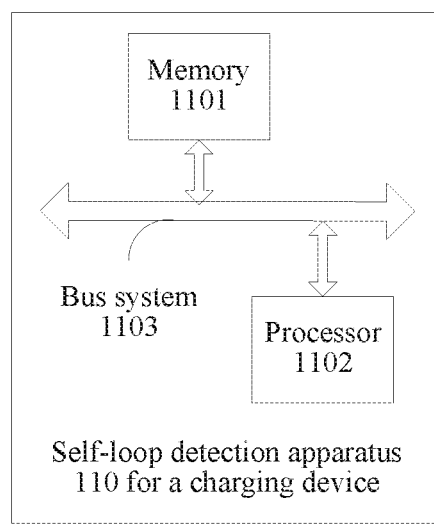
FIG. 11 is a schematic composition diagram of another self-loop detection apparatus for a charging device according to an embodiment of the present disclosure.

As shown in FIG. 11, FIG. 11 shows a self-loop detection apparatus 110 for a charging device according to an embodiment of the present disclosure, to execute the self-loop detection method for a charging device shown in FIG. 5. The apparatus 110 includes a memory 1101, a processor 1102, and a bus system 1103.

The memory 1101 and the processor 1102 are coupled together using the bus system 1103. In addition to a data bus, the bus system 1103 may further include a power bus, a control bus, a status signal bus, and the like. However, for a purpose of clear description, various types of buses are all marked as the bus system 1103 in the figure.

The memory 1101 is configured to store a set of code, and the code is used to control the processor 1102 to perform the following operations: switching the outbound charging interface from an outbound charging state to an outbound charging stop state; detecting whether the inbound charging interface is switched from an inbound charging state to an inbound charging stop state; and determining, when it is detected that the inbound charging interface is switched from the inbound charging state to the inbound charging stop state, that a self-loop exists in the charging device when the outbound charging interface is in the outbound charging state.

Optionally, the processor 1102 is further configured to output a prompt message. The prompt message is used to remind a user that a self-loop exists in the charging device when the outbound charging interface is in the outbound charging state again.

According to the self-loop detection apparatus for a charging device provided in this embodiment of the present disclosure, when a self-loop exists in the charging device, an inbound charging interface and an outbound charging interface of the charging device are connected to each other. Therefore, when the outbound charging interface is switched from an outbound charging state to an outbound charging stop state, the inbound charging interface is naturally switched from an inbound charging state to an inbound charging stop state. Therefore, the detection apparatus may determine, according to this feature, whether the self-loop exists in the charging device.

In the several embodiments provided in the present application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for a charging device, wherein the charging device comprises an inbound charging interface and an outbound charging interface, wherein the inbound charging interface comprises a positive signal cable $D_i$ and a negative signal cable $D_i$, wherein the outbound charging interface comprises a positive signal cable $D_o$ and a negative signal cable $D_o$, wherein the inbound charging interface is in an inbound charging state, wherein the outbound charging interface is in an outbound charging state, and wherein the method comprises:
   switching the positive signal cable $D_o$ and the negative signal cable $D_o$ from a connected state to a disconnected state;
   detecting whether the positive signal cable $D_i$ and the negative signal cable $D_i$ are switched from the connected state to the disconnected state; and
   determining that a self-loop exists in the charging device when the positive signal cable $D_i$ and the negative signal cable $D_i$ are switched from the connected state to the disconnected state.

2. The method according to claim 1, wherein after determining that the self-loop exists in the charging device, the method further comprises controlling a current value of a current flowing into the inbound charging interface so that the current value is less than a maximum current value that exists when the self-loop exists in the charging device.

3. The method according to claim 1, wherein after determining that the self-loop exists in the charging device, the method further comprises controlling the outbound charging interface to enter an outbound charging stop state so that a current value is less than a maximum current value that exists when the self-loop exists in the charging device.

4. The method according to claim 1, wherein after determining that the self-loop exists in the charging device, the method further comprises controlling the inbound charging interface to enter an inbound charging stop state so that a current value is less than a maximum current value that exists when the self-loop exists in the charging device.

5. The method according to claim 1, wherein after determining that the self-loop exists in the charging device, the method further comprises outputting a prompt message, wherein the prompt message is used to remind a user that the self-loop exists in the charging device.

6. The method according to claim 5, wherein after outputting the prompt message, the method further comprises:
   determining whether the self-loop of the charging device is eliminated; and
   implementing, when the self-loop of the charging device is not eliminated, at least one of steps:
      controlling the outbound charging interface to enter an outbound charging stop state; controlling the inbound charging interface to enter an inbound charging stop state; and
      controlling a current value of a current flowing into the inbound charging interface so that the current value is less than a maximum current value that exists when the self-loop exists in the charging device.

7. The method according to claim 6, wherein determining whether the self-loop of the charging device is eliminated comprises:
   detecting whether a connection cable is removed from the outbound charging interface and detecting whether the connection cable is removed from the inbound charging interface; and
   determining that the self-loop of the charging device is eliminated when the connection cable is removed.

8. The method according to claim 6, wherein determining whether the self-loop of the charging device is eliminated comprises:
   detecting whether a connection cable is removed from the outbound charging interface; and
   determining that the self-loop of the charging device is eliminated when the connection cable is removed.

9. The method according to claim 6, wherein determining whether the self-loop of the charging device is eliminated comprises:
   detecting whether a connection cable is removed from the inbound charging interface; and
   determining that the self-loop of the charging device is eliminated when the connection cable is removed.

10. The method according to claim 9, wherein after determining that the self-loop exists in the charging device when the outbound charging interface is in the outbound charging state, the method further comprises outputting the prompt message, wherein the prompt message is used to remind the user that the self-loop exists in the charging device when the outbound charging interface is in the outbound charging state again.

11. An apparatus for a charging device, wherein the charging device comprises an inbound charging interface and an outbound charging interface, wherein the inbound charging interface comprises a positive signal cable $D_i$ and a negative signal cable $D_i$, wherein the outbound charging interface comprises a positive signal cable $D_o$ and a negative signal cable $D_o$, wherein the inbound charging interface is in an inbound charging state, wherein the outbound charging interface is in an outbound charging state, and wherein the apparatus comprises:
   a memory configured to store a set of code; and
   a processor coupled to the memory and configured to:
      switch the positive signal cable $D_o$ and the negative signal cable $D_o$ from a connected state to a disconnected state;
      detect whether the positive signal cable $D_i$ and the negative signal cable $D_i$ are switched from the connected state to the disconnected state; and
      determine, when the positive signal cable $D_i$ and the negative signal cable $D_i$ are switched from the connected state to the disconnected state, that a self-loop exists in the charging device.

12. The apparatus according to claim 11, wherein the processor is further configured to control the outbound charging interface to enter an outbound charging stop state so that a current value is less than a maximum current value that exists when the self-loop exists in the charging device.

13. The apparatus according to claim 11, wherein the processor is further configured to control the inbound charging interface to enter an inbound charging stop state so that a current value is less than a maximum current value that exists when the self-loop exists in the charging device.

14. The apparatus according to claim 11, wherein the processor is further configured to control a current value of a current flowing into the inbound charging interface so that the current value is less than a maximum current value that exists when the self-loop exists in the charging device.

15. The apparatus according to claim 11, wherein the processor is further configured to output a prompt message, wherein the prompt message is used to remind a user that the self-loop exists in the charging device.

16. The apparatus according to claim 15, wherein the processor is further configured to:
   determine whether the self-loop of the charging device is eliminated; and
   implement, when it is determined that the self-loop of the charging device is not eliminated, at least one of command:
      control the outbound charging interface to enter an outbound charging stop state;
      control the inbound charging interface to enter an inbound charging stop state; and
      control a current value of a current flowing into the inbound charging interface so that the current value is less than a maximum current value that exists when the self-loop exists in the charging device.

17. The apparatus according to claim 16, wherein the processor is further configured to implement at least one of:
   detecting whether a connection cable is removed from the outbound charging interface;
   detecting whether the connection cable is removed from the inbound charging interface; and
   determine that the self-loop of the charging device is eliminated when the connection cable is removed from the outbound charging interface, or the connection cable is removed from the inbound charging interface.

18. A non-transitory computer-readable storage medium comprising instructions for a charging device, wherein the charging device comprises an inbound charging interface and an outbound charging interface, wherein the inbound charging interface comprises a positive signal cable $D_i$ and a negative signal cable $D_i$, wherein the outbound charging interface comprises a positive signal cable $D_o$ and a negative signal cable $D_o$, wherein the inbound charging interface is in an inbound charging state, wherein the outbound charging interface is in an outbound charging state, and wherein the instructions, when executed by a computer, cause the computer to:
   switch the positive signal cable $D_o$ and the negative signal cable $D_o$ from a connected state to a disconnected state;
   detect whether the positive signal cable $D_i$ and the negative signal cable $D_i$ are switched from the connected state to the disconnected state; and
   determine that a self-loop exists in the charging device when the positive signal cable $D_i$ and the negative signal cable $D_i$ are switched from the connected state to the disconnected state.

* * * * *